United States Patent
Dropps et al.

(10) Patent No.: US 7,518,995 B1
(45) Date of Patent: Apr. 14, 2009

(54) METHOD AND SYSTEM FOR MANAGING FRAME FLOW IN FIBRE CHANNEL SYSTEMS

(75) Inventors: Frank R. Dropps, Maple Grove, MN (US); Ernest G Kohlwey, Eagan, MN (US); Mark A. Owen, Apple Valley, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 522 days.

(21) Appl. No.: 11/362,690

(22) Filed: Feb. 27, 2006

(51) Int. Cl.
*H04J 1/16* (2006.01)
(52) U.S. Cl. .................. 370/235; 370/401; 370/428
(58) Field of Classification Search .................. 370/229, 370/235, 241, 252, 351, 389, 400, 401, 402, 370/403, 404, 428; 375/219, 220
See application file for complete search history.

(56) References Cited

U.S. PATENT DOCUMENTS

2003/0016683 A1* 1/2003 George et al. .............. 370/404
2005/0030893 A1* 2/2005 Dropps et al. ............... 370/229
2005/0073956 A1* 4/2005 Moores et al. .............. 370/235

OTHER PUBLICATIONS

American National Stansard for Information Technology, Fibre Channel: Framing and Signaling-2, Dec. 2004, Rev. 0.50, pp. 18,46,87 (04_045v5.pdf).*

* cited by examiner

*Primary Examiner*—Ricky Ngo
*Assistant Examiner*—Paul Masur
(74) *Attorney, Agent, or Firm*—Klein, O'Neil & Singh, LLP

(57) ABSTRACT

Method and system for managing frame traffic in a Fibre Channel network with plural switch elements with receive and transmit ports is provided. The method includes limiting a number of R_RDYs sent between frames, when frames are waiting to be transmitted at a given time, for minimizing a number of ordered sets transmitted between frames. The switch element includes a R_RDY control module that stores a number of R_RDYs that a port has to send, stores an actual number of R_RDYs that are sent since a last frame is transmitted; stores a number of R_RDYs that are sent between frames and this number of R_RDYs can be programmed to be less than two; and stores a threshold value that is less than or equal to a maximum R_RDY count value.

21 Claims, 10 Drawing Sheets

Table 1

| Frame Sequence with 2 R_RDYs between Frame 1 and Frame 2 | Frame Sequence with 1 R_RDY between Frame 1 and Frame 2 |
|---|---|
| Frame 1 | Frame 1 |
| Frame 1 | Frame 1 |
| Frame 1 (EOF) | Frame 1 (EOF) |
| Idle | Idle |
| R_RDY | Idle |
| Idle | R_RDY |
| Idle | Idle |
| R_RDY | Idle |
| Idle | Idle |
| Idle | Frame 2 (SOF) |
| Frame 2 (SOF) | Frame 2 (Multiple Words) |
| Frame 2 (Multiple Words) | Frame 2 (EOF) |
| Frame 2 (EOF) | Idle |
| Idle | Idle |
| Idle | R_RDY |
| Idle | Idle |
| Idle | Idle |
| Idle | Frame 3 (SOF) |
| Frame 3 (SOF) | Frame 3 |
| Frame 3 | Frame 3 |
| Frame 3 | |

| Frame Sequence when 2 Idles are sent between primitives | Frame Sequence when 1 Idle is sent between primitives |
|---|---|
| Frame 1 (SOF)<br>Frame 1<br>Frame 1 (EOF)<br>Idle<br>Idle<br>R_RDY<br>Idle<br>Idle<br>R_RDY<br>Idle<br>Idle<br>Frame 2 (SOF)<br>Frame 2 (Multiple Words)<br>Frame 2 (EOF)<br><br>300C | Frame 1 (SOF)<br>Frame 1<br>Frame 1 (EOF)<br>Idle<br>R_RDY<br>Idle<br>R_RDY<br>Idle<br>Frame 2 (SOF)<br>Frame 2 (Multiple Words)<br>Frame 2 (EOF)<br><br>300D |

FIG. 3B

METHOD AND SYSTEM FOR MANAGING FRAME FLOW IN FIBRE CHANNEL SYSTEMS

BACKGROUND

1. Field of the Invention

The present invention relates to fibre channel systems, and more particularly, to managing frame flow.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices.

A fibre channel switch is a multi-port device where each port manages a simple point-to-point connection between itself and its attached system. Each port can be attached to a server, peripheral, I/O subsystem, bridge, hub, router, or even another switch.

Fibre channel switches use memory buffers to hold frames received and sent across a network. Associated with these buffers are credits, which are the number of frames that a buffer can hold per fabric port.

Fibre channel devices use two primitive signals over a single link for indicating events at a transmitting port. The primitive signals are "IDLE" and R_RDY (or VC-RDY for virtual lanes). The Idle primitive keeps a link active while there is no data to send. The R_RDY primitive is used for buffer-to-buffer flow control. A buffer at a port that is ready to accept a frame transmits the R_RDY primitive to signal to a transmitting port that it is ready to receive a frame. Per Fibre Channel standards, each R_RDY primitive must be preceded and followed by two Idle primitives.

Fibre channel switches may use "virtual lanes" (VL) (or virtual channels) to transmit frames. In the VL environment, the VC_RDY primitive performs the same function as the R_RDY primitive.

Fibre channel standards (for example, FC-FC-2 available at the website for T11.org, incorporated herein by reference in its entirety) define the rules for frame transmission/flow control. Frames are transmitted with at least 6 (six) ordered sets between them. Ordered sets are special 40-bit codes and include Idle and R_RDY primitives.

Transmitting multiple R_RDYs between frames can cause the average number of ordered sets between frames to be greater than 6. This can reduce throughput, especially if many small frames are transmitted and is hence undesirable.

Therefore, there is a need for a method and system to better manage frame flow in general and R_RDYs in particular.

SUMMARY OF THE PRESENT INVENTION

In one aspect of the present invention, a method for managing frame traffic in a Fibre Channel network comprising of plural switch elements with receive and transmit ports is provided. The method includes limiting a number of R_RDYs sent between frames, when frames are waiting to be transmitted at a given time, for minimizing a number of ordered sets transmitted between frames.

In another aspect of the present invention, a method for managing frame flow in a Fibre Channel network system is provided. The method includes determining if a frame is waiting for transmission at a given time, and if a frame is waiting for transmission and a R_RDY count value based on a number of R_RDYs that a port needs to send is equal to or greater than a R_RDY threshold value, sending R_RDYs until the R_RDY count value is equal to zero. If the R_RDY count value is less than the threshold value and if a R_RDY sent value is less than a programmed R_RDY limit value that is based on a maximum number of R_RDYs that a port can send, then a R_RDY primitive is sent.

In another aspect of the present invention, a switch element in a Fibre Channel network is provided. The switch element includes a R_RDY control module for controlling R_RDY flow, wherein the R_RDY control module stores a number of R_RDYs that a port has to send, stores an actual number of R_RDYs that are sent since a last frame is transmitted; stores a number of R_RDYs that are sent between frames and this number of R_RDYs can be programmed to be less than two (2); and stores a threshold value that is less than or equal to a maximum R_RDY count value.

In yet another aspect of the present invention, a Fibre Channel switch element in a Fibre Channel network is provided. The switch element includes a port for sending less than two Idle primitive between two R_RDYs and/or between R_RDYs and Fibre channel frames.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWING

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 3A shows a table showing the difference between the conventional approach of sending R_RDYs with the approach used by the adaptive aspects of the present invention;

FIG. 3B shows a table with frame sequence where 2 Idles are sent between primitives versus when only 1 Idle is sent between primitives, according to one aspect of the present invention;

DETAILED DESCRIPTION OF THE PREFERRED EMBODIMENTS

Figure 1A:
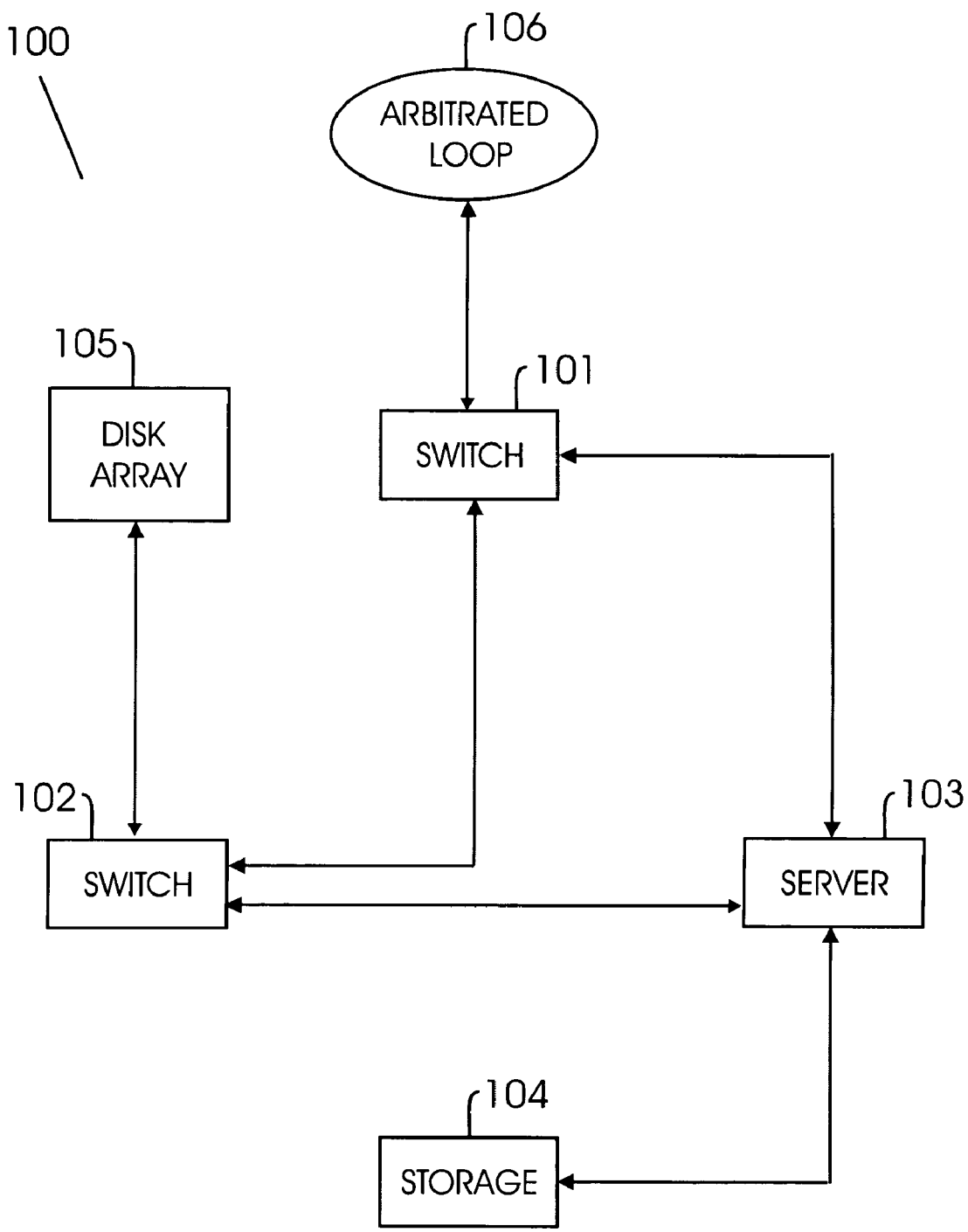
FIG. 1A shows an example of a Fibre Channel network system.

Definitions:

The following definitions are provided as they are typically (but not exclusively) used in the fibre channel environment, implementing the various adaptive aspects of the present invention.

"E-Port": A fabric expansion port that attaches to another Interconnect port to create an Inter-Switch Link.

"F_Port": A fabric port to which non-loop N_Ports are attached to a fabric and does not include FL_ports.

"Fibre channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre Channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": A topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Inter-Switch Link": A Link directly connecting the E_port of one switch to the E_port of another switch.

Port: A general reference to N. Sub.—Port or F.Sub.—Port.

"L_Port": A port that contains Arbitrated Loop functions associated with the Arbitrated Loop topology.

"N_Port": A direct fabric attached port.

"NL_Port": A L_Port that can perform the function of a N_Port.

"R_RDY": Flow control primitive signal used for establishing credit. Receiving an R_RDY primitive increases credit for transmitting another frame, while sending a R_RDY frame decreases credit.

"Switch": A fabric element conforming to the Fibre Channel Switch standards.

"VL" (Virtual Lane): A virtual portion of the data path between a source and destination port each having independent buffer to buffer flow control.

"VC-RDY": A primitive used in the virtual lane environment and serves the same purpose as the R_RDY primitive.

In one aspect of the present invention, the number of R_RDYs that are sent is optimized so that overall performance/frame flow is efficient. Also, the number of Idles sent between R_RDYs and/or R_RDYs and frames is varied so that the average number of ordered sets is optimal.

To facilitate an understanding of the preferred embodiment, the general architecture and operation of a fibre channel system will be described. The specific architecture and operation of the preferred embodiment will then be described with reference to the general architecture of the fibre channel system.

Fibre Channel System:

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

FABRIC SWITCH ELEMENT

Figure 1B:
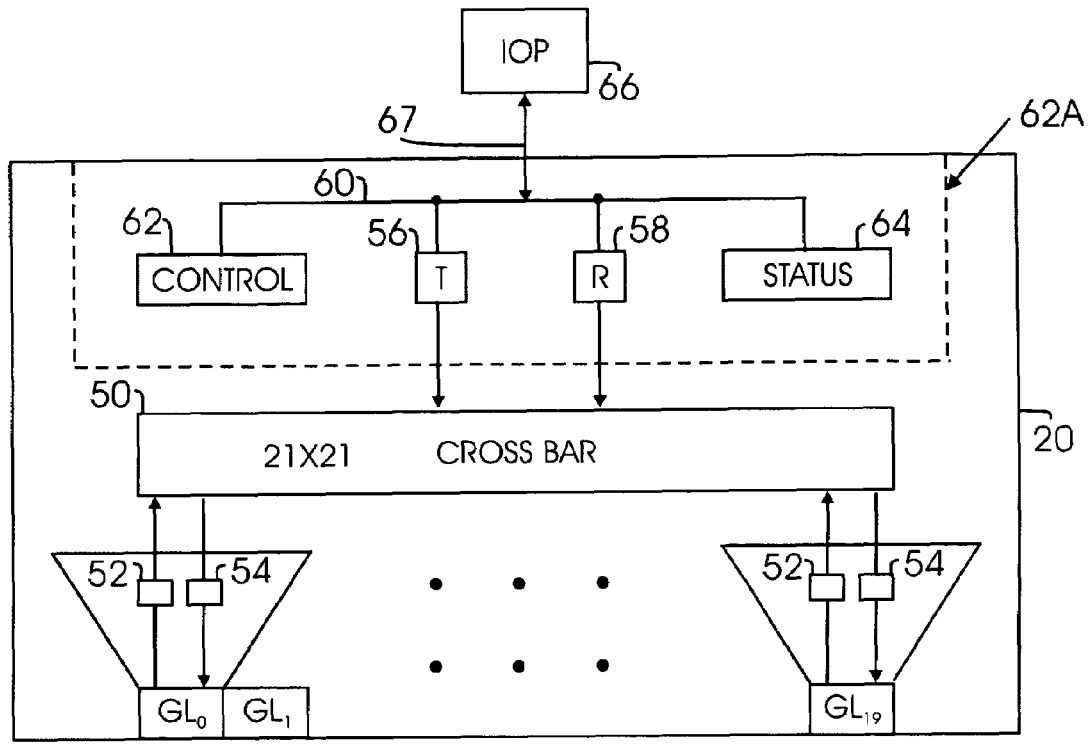
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port, and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
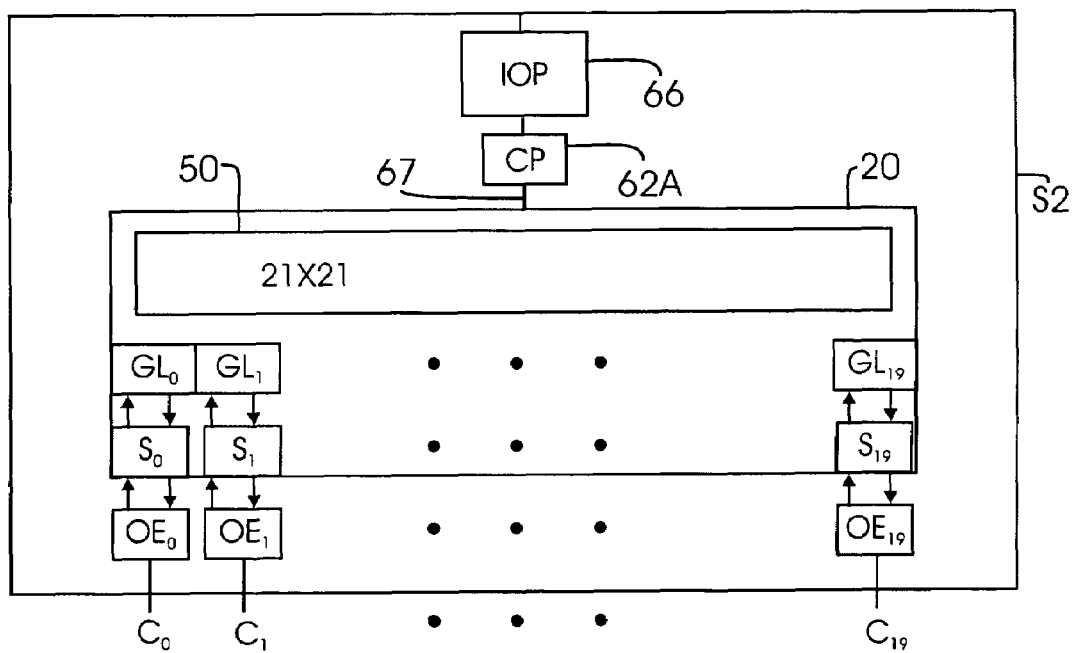
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL ports correspond to channel C0-C19. Each GL port has a serial/deserializer (SERDES) designated as S0-S19. Ideally, the SERDES functions are implemented on ASIC 20 for efficiency, but may alternatively be external to each GL port.

Each GL port has an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
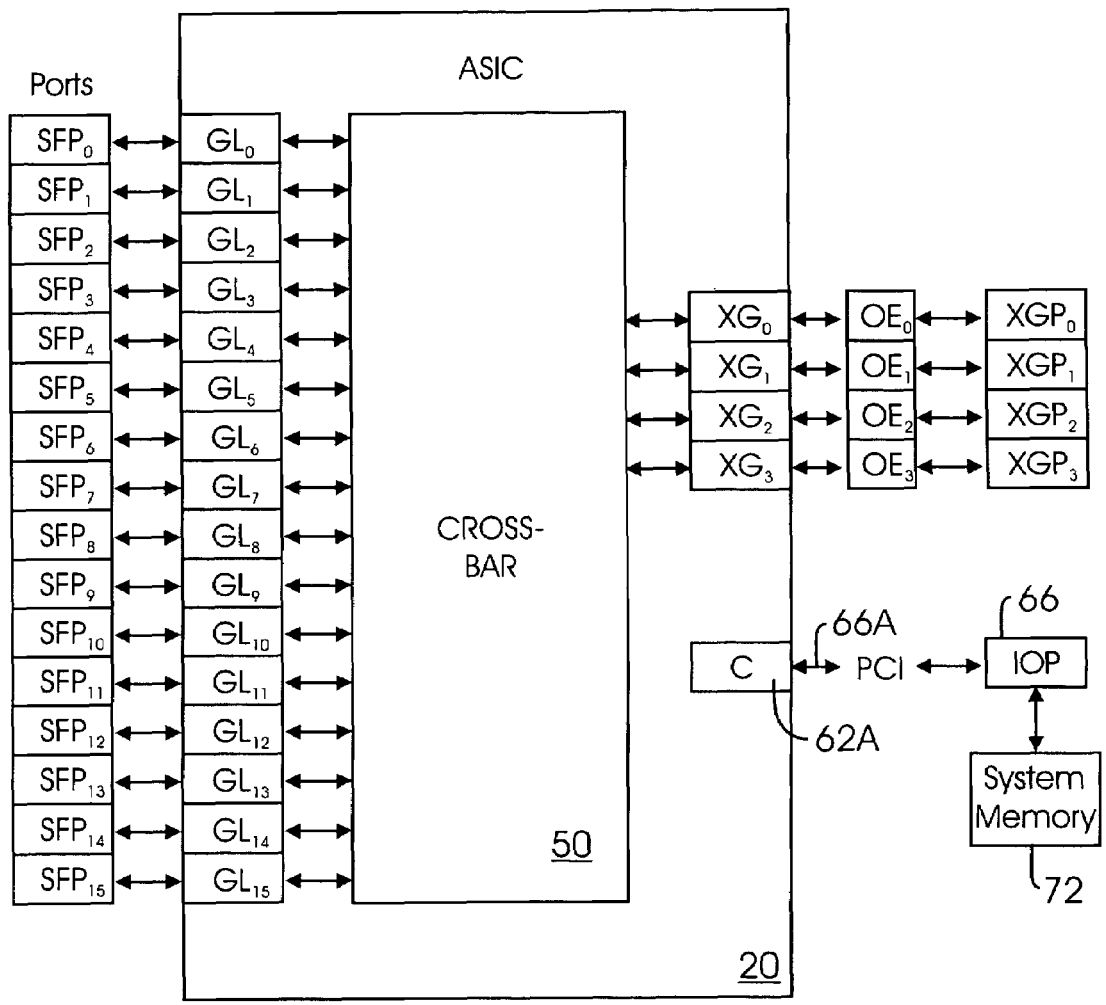
FIG. 1D shows a block diagram of an ASIC, according to yet another aspect of the present invention.

FIG. 1D shows a block diagram of ASIC 20 with sixteen GL_Ports designated as GL0-GL15 and four 10G port control modules designated as XG0-XG3. ASIC 20 include a control port 62A that is coupled to IOP 66 through a PCI connection 66A. System memory 72 is available for storing firmware (executable code) that is executed by IOP 66 for controlling overall switch element 20 functionality.

Figure 1E:
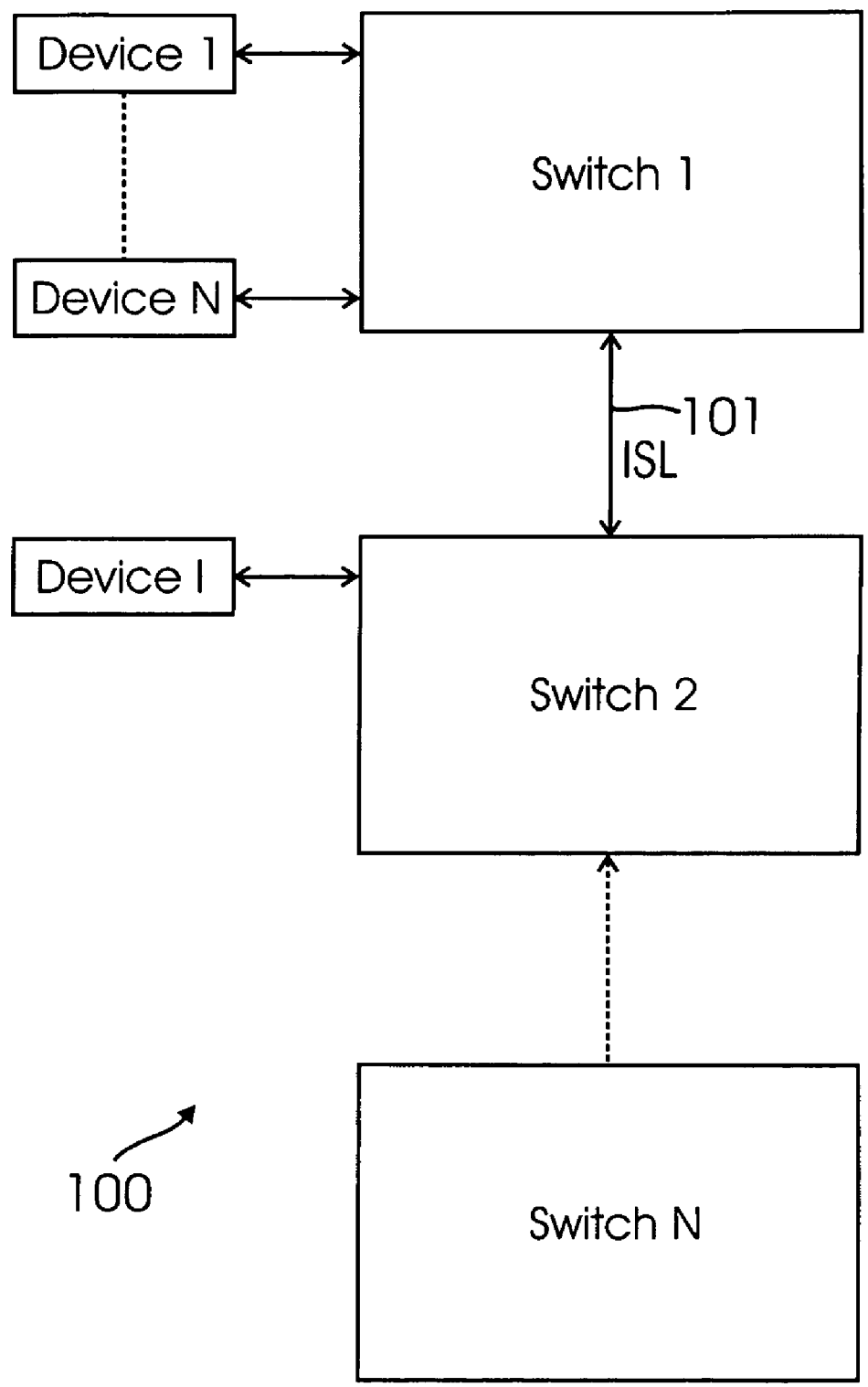
FIG. 1E shows a top-level block diagram of a Fabric, used according to one aspect of the present invention.

FIG. 1E shows an example of a Fabric topology that can use the R_RDY flow control process/mechanism described below. Fabric Topology 100 includes plural switch elements, shown as Switch 1, Switch 2 and Switch N. Plural devices shown as Device 1, Device N can be attached to each switch element directly. ISL 101 is used to couple to switch elements directly. The switch elements of FIG. 1E are similar to those shown in FIGS. 1B-1D and described above.

Figure 2A:
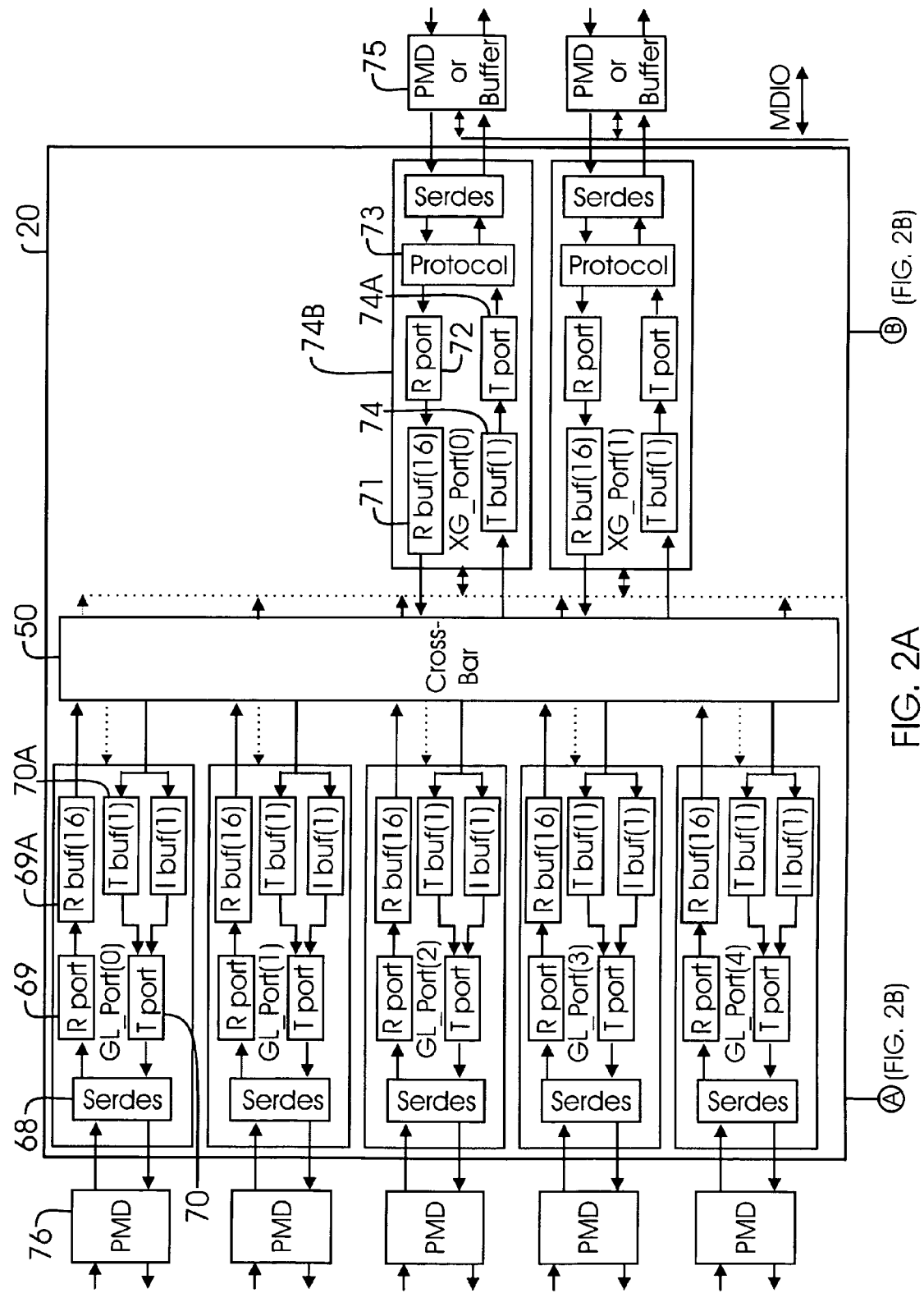
FIGS. 2A/2B show a top-level block diagram of a switch element used according to one aspect of the present invention.
Figure 2B:
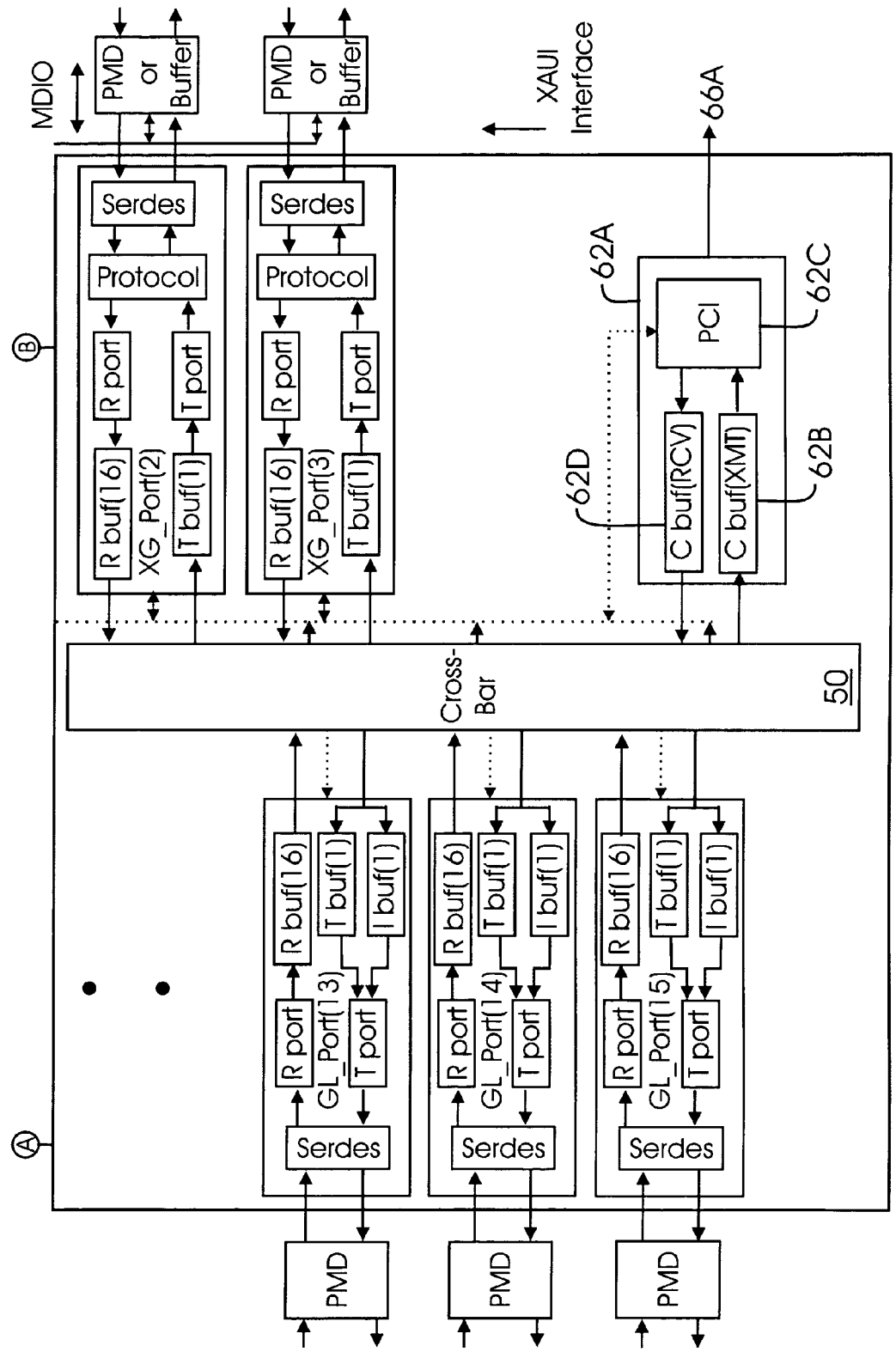

FIGS. 2A/2B (jointly referred to as FIG. 2) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A. GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

RPORT 69 receives incoming frames via SERDES 68 and outgoing frames are transmitted using TPORT 70. Buffers 69A and 70A are used to stage frames in the receive and the transmit path.

R RDY Control:

FIG. 3A provides a Table with two columns, 300A and 300B. Column 300A shows a sequence of frames when 2 R_RDYs are sent between two frames (shown as Frame 1 and Frame 2). TPORT 70 transmits the following pattern: Frame 1, 2 R_RDYs, Frame 2 and Frame 3. There are 8 ordered sets between frame 1 and frame 2, 6 ordered sets between frame 2 and frame 3. Hence the average number of ordered sets is 7. This is larger than the minimum number of 6 (six) ordered sets that are allowed by the Fibre Channel standard. Overall data transfer performance is reduced because there are more ordered sets.

Column 300B shows the frame sequence provided by the adaptive aspects of the present invention. In this sequence, the number of R_RDYs is limited to 1, i.e., between Frame 1 and Frame 2, only 1 (one) R_RDY is sent. The second R_RDY is transmitted between Frame 2 and Frame 3. The sequence in column 300B has the same number of frames (frame 1, frame 2 and frame 3) but the average number of ordered sets is 6, instead of 7 (in column 300B), which improves performance and throughput.

FIG. 3B shows another table with columns 300C and 300D. Column 300C shows the frame sequence for the conventional approach where 2 Idles are sent between primitives (R_RDYs), while column 300D shows the frame sequence when only 1 Idle is sent, according to the adaptive aspects of the present invention.

In one aspect of the present invention, the number of R_RDYs that are sent between the frames is limited, when frames are waiting for transmission. If no frames are waiting, then TPORT 70 sends out as many R_RDYs it has to send. When frames are waiting for transmission, the number of R_RDYs is limited.

In another aspect of the present invention, a method/system is provided by which the number of pending R_RDYs at a given time is optimized. This minimizes the number of R_RDYs waiting for transmission, at any given time.

Figure 4:
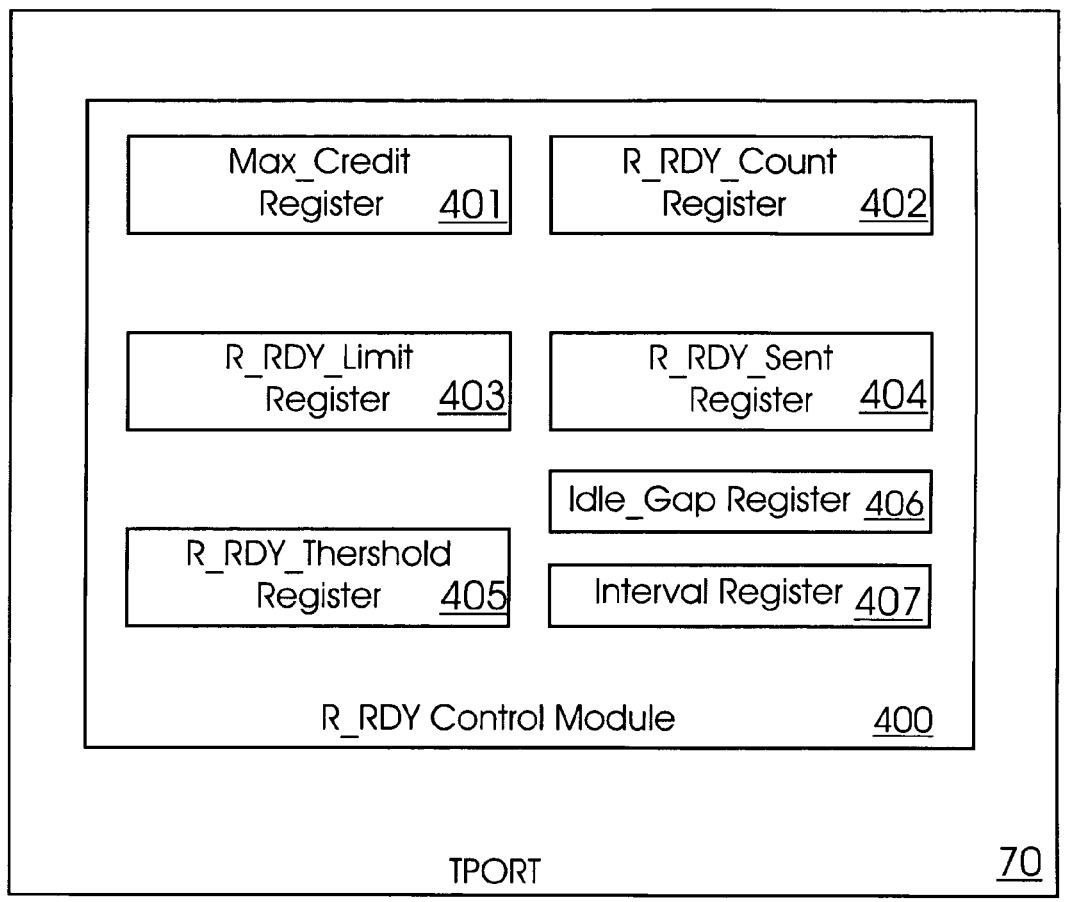
FIG. 4 shows a block diagram of a R_RDY CONTROL module, according to one aspect of the present invention.

FIG. 4 shows a block diagram of a R_RDY control module 400 (referred to as Module 400) that is used by TPORT 70 to control the R_RDY flow to optimize overall switch element 20 performance. Module 400 uses the following registers: Max_Credit register 401; R_RDY_Count register 402; R_RDY limit register 403; R_RDY_Sent register 404; R_RDY_threshold register 405; Idle_Gap register 406 and Interval register 407.

Max_Credit register 401 specifies the maximum number of credits that is available to the other port linked to TPORT 70. This number is typically advertised when the ports log into the Fabric.

R_RDY_Count register 402 stores a value, which is the number of R_RDYs that a TPORT 70 needs to send. This number is normally increased when receive buffers 69A are emptied (which signifies that space is now available to receive frames) and decreased when a R_RDY is sent. Initially, register 402 value is set to zero (or some arbitrary value).

R_RDY limit register 403 stores the number of R_RDYs that are sent between frames. IOP 66 can program this number. In one aspect, IOP 66 can program this value to be 1, when a frame is waiting to be sent, as described below with respect to the flow chart of FIG. 5.

R_RDY_Sent register 404 is used to store the actual number of R_RDYs that are sent since a "last" frame was transmitted. Register 404 is set to have an initial value of zero, before a R_RDY is sent.

_R_RDY_threshold register 405 stores the threshold value for R_RDY count. This allows a port to send pending R_RDYs and optimizes performance especially if frame transmission has slowed due to slow transmission of pending R_RDYs.

Max_Credit register 401 values and R_RDY threshold register 405 values are set before frame transmission starts. In one aspect, threshold value is less than or equal to the maximum count value.

In yet another aspect of the present invention, instead of sending two Idle primitives between two R_RDYs, the present invention sends only 1 Idle primitive (or zero Idle primitive) between 2 R_RDYs. The Fibre Channel standard requires that at least two (2) Idles must be sent between 2 R_RDYs. By sending only one Idle (or less than two Idles), against the Fibre Channel standard, while maintaining a minimum of 6 ordered sets, as required by the Fibre Channel standard, the port links can still operate in the Fabric environment. This is achieved by using two registers, Idle_Gap register 406 and Interval register 407.

Register 406 stores the number of Idles between R_RDYs or between R_RDYs and frames. Register 407 stores the number of ordered sets that are transmitted since a last frame. Register 407 value is used to ensure that at least 6 ordered sets per the Fibre Channel standards are being maintained.

It is noteworthy that the adaptive aspects of the present invention, also allow a port to operate in a controlled mode. During this mode, the port can send less than 6 ordered sets. IOP 66 by setting a bit in CPORT 62A can enable the controlled mode.

It is noteworthy that although the foregoing description and the description below is based on R_RDYs, the present invention is not limited to R_RDYs. In a switch environment, where virtual lanes (is also referred to as virtual channels) are used, the same mechanism/process can be used to handle VC_RDYs. The use of the term R_RDY throughout this specification is interchangeable with a VC_RDY. Multiple registers can be used for each supported VC_RDY.

Figure 5:
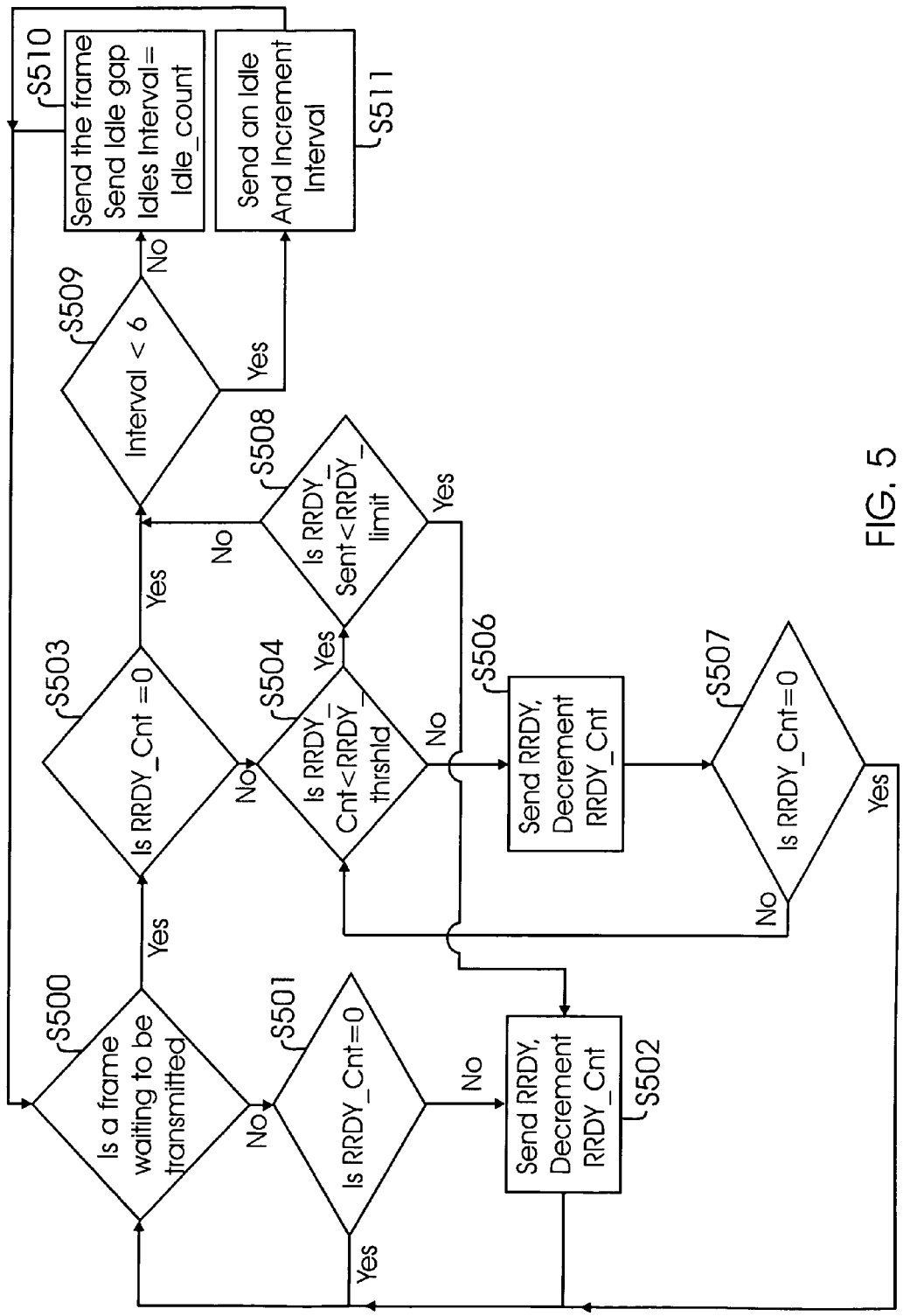
FIG. 5 shows a process flow diagram for sending R_RDYs (or VC_RDYs)/Idles, according to one aspect of the present invention.

FIG. 5 shows a process flow diagram for controlling R_RDY/Idle primitive flow to optimize and improve switch element 20/Fabric 100 performance. Turning in detail to FIG. 5, in step S500, the process determines if a frame is waiting for transmission. If a frame is not waiting for transmission, then in step S501, the process determines if the R_RDY count value is greater than zero. This is obtained from register 402. If R_RDY count value is not equal to zero, then in step S502, TPORT 70 sends out a R_RDY. The R_RDY_sent register 404 value is increased, while the R_RDY_count register 402 is decreased. A certain number of Idles are also sent. This number is either 1 or 2 depending on the value set in register 406. Interval register 407 value is increased by 1 or 2, depending on if 1 or 2 Idles are sent. Thereafter, the process returns to step S500.

If a frame is waiting in step S500, then in step S503, R_RDY_Count register 402 value is checked. If this value is not equal to zero, then in step S504, the process determines if the register 402 value is less than the R_RDY threshold value as stored in register 405. If the R_RDY count is not less than the threshold value, then in step S506, the R_RDY is sent. Register 402 value is decreased, while R_RDY_sent register 404 value is increased. Once again, a certain number of Idles are also sent. This number is either 1 or 2 depending on the value set in register 406. Interval register 407 value is increased by 1 or 2, depending on if 1 or 2 Idles are sent.

It is noteworthy that the number of Idles can also be reduced to zero, according to one aspect of the present invention.

In step S507, the process determines if R_RDY count is equal to zero. If yes, the process moves to step S500. If the count is not equal to zero, the process moves to step S504.

If R_RDY_Count is less than the threshold value in step S504, then in step S508, the process determines if R_RDY sent register 404 value is less than the R_RDY limit value in register 403. If yes, the process moves to step S502. If the sent value is greater than the limit, then the process moves to step S509.

During step S509, the process determines the number of ordered sets by reading register 407. If the number of ordered sets is greater than or equal to 6, then in set S510, the frame is sent. Once again, a certain number of Idles are also sent. This number is either 1 or 2 depending on the value set in register 406. Register 407 value is also increased based on the value.

If the interval in step S509 is less than 6, then an Idle is sent and register 407 value is increased in step S511.

The adaptive aspects of the present invention improve performance and optimize overall frame flow. This is achieved by controlling the number of R_RDYs that are sent between frames, so that the average time between frame transmissions is minimized. Furthermore, the number of Idles between R_RDYs or between a R_RDY and a frame in the Fabric environment can be reduced to 1 (or zero) from the Fibre Channel standard of 2 Idles. This also improves transmission throughput.

Although the present invention has been described with reference to specific embodiments, these embodiments are illustrative only and not limiting. Many other applications and embodiments of the present invention will be apparent in light of this disclosure and the following claims.

What is claimed is:

1. A method for managing frame flow in a Fibre Channel network system, comprising:
    (a) determining if a frame is waiting for transmission at a transmit segment of a port of a Fibre Channel switch element at any given time; wherein the Fibre Channel switch element includes a plurality of ports, each port including a receive segment for receiving frames and a transmit segment for transmitting frames;
    (b) if a frame is waiting for transmission in step (a), checking if a R_RDY register count value is greater than zero, wherein the R_RDY register stores a value indicating a number of R_RDYs that the port has to send, where R_RDY is a primitive indicating available credit at a receive segment of a destination port;
    (c) comparing the R_RDY register count value with a threshold value programmed in a threshold register; wherein the threshold register stores the threshold value for controlling how often pending R_RDYs are sent by the transmit segment;
    (d) sending a R_RDY if the R_RDY register count is greater than zero and greater than the threshold value, based on the comparison in step (c); and
    (e) sending a certain number of idle primitives after the R_RDY is sent in step (d); wherein the certain number of idle primitives depend on a number of ordered sets that are transmitted since a last frame.

2. The method of claim 1, further comprising:
    sending a R_RDY, if the R_RDY register count value is less than the threshold value as determined in step (c) of claim 1; and if a R_RDY sent count value is less than a programmed R_RDY limit value; wherein the R_RDY limit value is based on a maximum number of R_RDYs that the port can send.

3. The method of claim 1, wherein a R_RDY sent count value is increased and the R_RDY register count value is decreased, when a R_RDY is sent, where the R_RDY is sent if the R_RDY count value is equal to or greater than the threshold value.

4. The method of claim 2, wherein the R_RDY sent count value is increased and the R_RDY register count value is decreased for each R_RDY sent when the R_RDY count value is less than the threshold value and if the R_RDY sent count value is less than the programmed R_RDY limit value.

5. The method of claim 1, wherein if no frames are waiting in step (a) of claim 1, and the R_RDY register count value is greater than zero in step (b) of claim 1, then the port sends an R_RDY and decreases the R_RDY register count value and increases a R_RDY sent value maintained by a R_RDY sent register.

6. The method of claim 1, wherein if a frame is waiting in step (a) of claim 1, then the frame is sent if: (i) the R_RDY register count value is greater than or equal to a R_RDY limit value; and (ii) the R_RDY count value is less than the R_RDY threshold value.

7. The method of claim 1, wherein the transmit segment maintains the R_RDY register count value, a R_RDY limit value that limits a number of R_RDYs that the port can send, a R_RDY sent value that indicates a number of R_RDYs sent by the port at any given time, and the threshold value.

8. The method of claim 1, wherein VC_RDYs are used instead of R_RDYs if the switch element uses virtual lanes.

9. A method for a Fibre Channel network comprising:
(a) determining if a frame is waiting for transmission at a transmit segment of a port of a Fibre Channel switch element at any given time; wherein the Fibre Channel switch element includes a plurality of ports, each port including a receive segment for receiving frames and a transmit segment for transmitting frames;
(b) if a frame is waiting for transmission in step (a), checking if a R_RDY register count value is greater than zero, wherein the R_RDY register stores a value indicating a number of R_RDYs that the port has to send; and wherein R_RDY is a primitive indicating available credit at a receive segment of a destination port;
(c) comparing the R_RDY register count value with a threshold value programmed in a threshold register; wherein the threshold register stores the threshold value for controlling how often pending R_RDYs are sent by the transmit segment;
(d) sending a R_RDY if the R_RDY register count is greater than zero and greater than the threshold value; and
(e) sending a certain number of idle primitives after the R_RDY is sent in step (d); wherein the certain number of idle primitives depend on a number of ordered sets that are transmitted since a last frame;
(f) sending a R_RDY, if the R_RDY register count value is less than the threshold value as determined in step (c); and if a R_RDY sent value is less than a programmed R_RDY limit value; wherein the R_RDY limit value is based on a maximum number of R_RDYs that the port can send; and
(g) if no frames are waiting in step (a), and the R_RDY register count value is greater than zero, then sending an R_RDY and decreasing the R_RDY register count value and increasing a R_RDY sent value maintained by a R_RDY sent register.

10. The method of claim 9, wherein a R_RDY sent count value is increased and the R_RDY register count value is decreased, when a R_RDY is sent, if the R_RDY count value is equal to or greater than the threshold value.

11. The method of claim 10, wherein VC_RDYs are used instead of R_RDYs if the switch element uses virtual lanes.

12. The method of claim 9, wherein the R_RDY sent count value is increased and the R_RDY register count value is decreased for each R_RDY sent, when the R_RDY count value is less than the threshold value and if the R_RDY sent count value is less than the programmed R_RDY limit value.

13. The method of claim 9, wherein if a frame is waiting in step (a) of claim 1, then the frame is sent if: (i) the R_RDY register count value is greater than or equal to a R_RDY limit value; and (ii) the R_RDY count value is less than the R_RDY threshold value.

14. The method of claim 9, wherein the transmit segment maintains the R_RDY register count value, the R_RDY limit value that limits a number of R_RDYs that the port can send, the R_RDY sent value that indicates a number of R_RDYs sent by the port at any given time; and the threshold value.

15. A switch element in a Fibre Channel network, comprising:
a plurality of ports, each port including a transmit segment for transmitting frames; and a R_RDY control module for controlling flow of R_RDYs transmitted between frames by a transmit segment of a port from among the plurality of ports, wherein R_RDY is a primitive indicating available credit at a receive segment of a destination port; and
wherein the R_RDY control modules stores;
(i) a number of R_RDYs that the port has to send;
(ii) an actual number of R_RDYs that are sent since a last frame is transmitted by the transmit segment;
(iii) a programmable number of R_RDYs that are sent between frames;
(iv) a threshold value for controlling how often pending R_RDYs are sent by the transmit segment of the port; and
(v) a programmable value that determines a number of idle primitives that are sent after an R_RDY is sent, wherein the programmable value depends on a number of ordered sets that are transmitted since a last frame is transmitted by the port; and wherein if a frame is waiting for transmission at any given time, the transmit segment:
(a) checks if a R_RDY register count value is greater than zero indicating a number of R_RDYs that the port has to send;
(b) compares the R_RDY register count value with the threshold value;
(c) sends a R_RDY if the R_RDY register count is greater than zero and greater than the threshold value; and
(d) sends the programmed number of idle primitives after the R_RDY is sent.

16. The switch element of claim 15, wherein a R_RDY limit register stores the number of R_RDYs sent between frames; a R_RDY Sent register stores the actual number of frames sent since the last frame was transmitted; and a threshold register stores the threshold value.

17. The switch element of claim 16, wherein if no frames are waiting, and the R_RDY register count value is greater than zero, then the port sends an R_RDY and decreases the R_RDY register count value and increases a R_RDY sent value maintained by the R_RDY Sent register.

18. The switch element of claim 15, wherein the port sends one Idle primitive between one or both of two R_RDYs; and between R_RDYs and frames.

19. The switch element of claim 18, wherein the number of Idles sent by the port are programmed by a switch element processor.

20. The switch element of claim 15, wherein the transmit segment maintains a value that reflects a number of ordered sets that have been sent between frames.

21. The switch element of claim 15, wherein the number of ordered sets is less than 6.

* * * * *

UNITED STATES PATENT AND TRADEMARK OFFICE
CERTIFICATE OF CORRECTION

| | | |
|---|---|---|
| PATENT NO. | : 7,518,995 B1 | Page 1 of 1 |
| APPLICATION NO. | : 11/362690 | |
| DATED | : April 14, 2009 | |
| INVENTOR(S) | : Frank R. Dropps et al. | |

It is certified that error appears in the above-identified patent and that said Letters Patent is hereby corrected as shown below:

On the Title page, in Item (56), in column 2, under "Other Publications", line 1, delete "Stansard" and insert -- Standard --, therefor.

In column 1, line 46, delete "FC-FC-2" and insert -- FC-FS-2 --, therefor.

In column 2, line 33, delete "DRAWING" and insert -- DRAWINGS --, therefor.

In column 3, line 22, delete "Channel" and insert -- channel --, therefor.

In column 3, line 61, delete "optimal ." and insert -- optimal. --, therefor.

In column 7, line 67, delete "set" and insert -- step --, therefor.

In column 10, line 8, in claim 14, delete "time;" and insert -- time, --, therefor.

Signed and Sealed this

Ninth Day of November, 2010

David J. Kappos
*Director of the United States Patent and Trademark Office*